(12) United States Patent
Chen et al.

(10) Patent No.: US 12,454,492 B2
(45) Date of Patent: Oct. 28, 2025

(54) CONTINUOUS ELECTROPHORETIC DEPOSITION MODIFIED CARBON FIBER REINFORCED MULTI-MATRIX COMPOSITE AND PREPARATION METHOD THEREOF

(71) Applicant: SUZHOU HONGJIU AVIATION THERMAL MATERIALS TECHNOLOGY CO., LTD., Taicang (CN)

(72) Inventors: Zhaofeng Chen, Taicang (CN); Jiahao Liao, Taicang (CN)

(73) Assignee: SUZHO HONGJIU AVIATION THERMAL MATERIALS TECHNOLOGY CO., LTD., Taicang (CN)

( * ) Notice: Subject to any disclaimer, the term of this patent is extended or adjusted under 35 U.S.C. 154(b) by 1104 days.

(21) Appl. No.: 17/310,577

(22) PCT Filed: Jan. 6, 2021

(86) PCT No.: PCT/CN2021/070430
§ 371 (c)(1),
(2) Date: Aug. 11, 2021

(87) PCT Pub. No.: WO2022/134214
PCT Pub. Date: Jun. 30, 2022

(65) Prior Publication Data
US 2022/0194862 A1 Jun. 23, 2022

(51) Int. Cl.
| | | |
|---|---|---|
| C04B 35/80 | (2006.01) |
| C04B 35/628 | (2006.01) |
| C04B 35/64 | (2006.01) |
| C08J 5/24 | (2006.01) |
| C22C 47/04 | (2006.01) |
| C22C 47/08 | (2006.01) |
| C22C 49/06 | (2006.01) |
| C22C 49/14 | (2006.01) |
| C25D 13/02 | (2006.01) |
| C25D 13/16 | (2006.01) |
| C25D 13/20 | (2006.01) |

(52) U.S. Cl.
CPC ........ *C04B 35/80* (2013.01); *C04B 35/62868* (2013.01); *C04B 35/62886* (2013.01); *C04B 35/64* (2013.01); *C08J 5/248* (2021.05); *C22C 47/04* (2013.01); *C22C 47/08* (2013.01); *C22C 49/06* (2013.01); *C22C 49/14* (2013.01); *C25D 13/02* (2013.01); *C25D 13/16* (2013.01); *C25D 13/20* (2013.01); *C04B 2235/3826* (2013.01); *C04B 2235/386* (2013.01); *C04B 2235/483* (2013.01); *C04B 2235/5248* (2013.01); *C04B 2235/5256* (2013.01); *C04B 2235/616* (2013.01); *C08J 2363/00* (2013.01)

(58) Field of Classification Search
CPC .............. C04B 35/80; C04B 35/62868; C04B 35/62886; C04B 35/64; C04B 2235/3826; C04B 2235/386; C04B 2235/483; C04B 2235/5248; C04B 2235/5256; C04B 2235/616; C04B 2235/77; C04B 2235/96; C04B 35/571; C04B 2235/5454; C04B 35/6264; C04B 35/83; C04B 2235/3217; C04B 2235/3244; C04B 2235/3418; C04B 2235/3839; C04B 2235/3873; C08J 5/248; C08J 2363/00; C22C 47/04; C22C 47/08; C22C 49/06; C22C 49/14; C22C 47/02; C22C 47/14; C22C 47/20; C22C 49/02; C22C 49/08; C25D 13/02; C25D 13/16; C25D 13/20; C25D 13/12; C25D 13/22; B22F 1/107; B22F 2999/00; C23C 16/26

See application file for complete search history.

(56) References Cited

FOREIGN PATENT DOCUMENTS

CN 103910532 B * 12/2015
CN 110396652 A * 11/2019

OTHER PUBLICATIONS

Machine Translation of CN 103910532 B (Year: 2015).*
International Search Report for PCT/CN2021/070430 (Year: 2021).*
Written Opinion of the International Searching Authority for PCT/CN2021/070430 (Year: 2021).*
Machine Translation of CN 110396652 A (Year: 2019).*

* cited by examiner

*Primary Examiner* — Daniel J. Schleis
(74) *Attorney, Agent, or Firm* — Platinum Intellectual Property

(57) ABSTRACT

The present disclosure discloses a continuous electrophoretic deposition modified carbon fiber reinforced multi-matrix composite and a preparation method thereof, composing of a carbon fiber with a volume fraction of 30-55%, an inorganic powder with a volume fraction of 3-25% and a matrix with a volume fraction of 20-67%, wherein the inorganic powder is wrapped on the surface of the carbon fiber filament or embedded in the carbon fiber bundle, and the concentration gradually decreases from the fiber filament to the surface of the fiber bundle. The preparation method of the composite is as follows: (1) pretreating the carbon fibers; (2) preparing a slurry of the inorganic powder; (3) widening the pretreated carbon fiber to form a carbon fiber strip, and then carrying out electrophoretic deposition on the inorganic powders; (4) preparing a preform from the deposited carbon fibers; and (5) compounding a matrix in the preform.

14 Claims, No Drawings

CONTINUOUS ELECTROPHORETIC DEPOSITION MODIFIED CARBON FIBER REINFORCED MULTI-MATRIX COMPOSITE AND PREPARATION METHOD THEREOF

RELATED APPLICATIONS

This application is a United States National Stage Application filed under 35 U.S.C 371 of PCT Patent Application Serial No. PCT/CN2021/070430, filed Jan. 6, 2021, which claims Chinese Patent Application Serial No. CN 202011523615.4, filed Dec. 22, 2020, the disclosure of all of which are hereby incorporated by reference in their entirety.

TECHNICAL FIELD

The present disclosure relates to a composite material and a preparation method thereof, and more particularly to a continuous electrophoretic deposition modified carbon fiber reinforced multi-matrix composite and a preparation method thereof.

BACKGROUND ART

Continuous carbon fiber reinforced composites have been widely used in the field of aviation, aerospace, transportation and chemicals, due to their excellent characteristics such as low density, high specific strength, high specific modulus and good impact resistance. At present, the common continuous carbon fiber reinforced composites mainly include continuous carbon fiber reinforced ceramic matrix composites, continuous carbon fiber reinforced resin matrix composites and continuous carbon fiber reinforced metal matrix composites.

For continuous carbon fiber reinforced ceramic matrix composites, to increase the fracture toughness of the composite and protect carbon fibers during the preparation of ceramic matrix, the surface interface treatment of carbon fiber is required to improve the binding strength of the carbon fiber and the ceramic matrix while reducing the damage of the carbon fiber during the preparation of the ceramic matrix. The interface phase of the continuous carbon fiber reinforced ceramic matrix composite is mainly pyrolytic carbon, silicon carbide and hexagonal boron nitride, which is generally prepared on the carbon fiber surface by chemical vapor deposition process, although these interface phases can transfer loads, deflect cracks, and buffer thermal stress, but the preparation of the interface phase significantly reduces the flexibility and strength of the carbon fiber itself, thereby making it difficult for the carbon fiber to fully exert its functions, and the actual mechanical properties of the composite are far below the theoretical expected value.

Nano-ceramic particles can be used as second-phase reinforced continuous carbon fiber reinforced composites due to their excellent characteristics. Because of their nano-scale effects, they can also effectively deflect cracks as the interface phase of carbon fibers, consume a large amount of fracture energy, and improve the fracture toughness of composites. At the same time, since there is no metallurgical sintering combination between particles and particles, the flexibility of carbon fiber can be guaranteed. In addition, nano-ceramic particles can be prepared to the carbon fiber surface at a low temperature environment, thereby avoiding the decrease in strength of carbon fibers, and can effectively exert the reinforcing effect of the carbon fiber.

For continuous carbon fiber reinforced resin matrix composites, since the resin matrix does not reduce the strength and flexibility of the carbon fiber relative to the ceramic substrate, so its room temperature can be excellent. However, since the resin matrix itself has poor heat resistance and poor thermal conductivity, the temperature resistance of the continuous carbon fiber reinforced resin matrix is low and the thermal conductivity is low, thereby limiting the application range of the continuous carbon fiber reinforced resin matrix composite. While the nano-ceramic particles themselves have excellent high temperature resistance and high thermal conductivity. When they are used as the second phase to be reinforced into the continuous carbon fiber reinforced resin matrix composites, the temperature resistance and thermal conductivity of the composite can be significantly improved.

The Chinese invention patent with a patent number of CN104150939B discloses a preparation method of electrophoretic deposition carbon nanotubes (CNTs) reinforced ceramic matrix composites. The patent first uses electrophoretic deposition to deposit CNTs on a 2D carbon fiber cloth deposited with a pyrolytic carbon layer, and then uses chemical vapor deposition to deposit silicon carbide (SiC) matrix, thereby preparing electrophoretic deposition CNTs reinforced ceramic matrix composites. This method can not only reduce the damage of high temperature and the catalyst to the reinforcement, but also can make the CNTs uniformly dispersed on the preform fiber, can give full play to the synergistic strengthening effect of micrometer and nanometer, and improve the strength and toughness of the C/SiC composites.

The Chinese invention patent with a publication number of CN110453266A discloses a method for preparing high-performance composites by electrophoretic deposition of polymer micro-nano particles on the surface of carbon fibers, first, a carbon fiber (CF) matrix is treated with dopamine (DA): DA is deposited and polymerized on the surface of CF to form polydopamine to improve the adhesion of polymer micro/nano particles to the surface of CF; then, electrophoresis is used to deposit polymer micro/nano particles with different morphology, particle size, composition and surface containing different functional groups on the surface of CF to improve the interface performance between CF and polymer matrix. The invention uses electrophoresis to deposit and adsorb polymer micro/nano particles with different compositions, shapes, surface functional groups and morphologies to the surface of polydopamine modified CF, so as to improve the physical and mechanical interlocking and chemical bonding between CF and polymer matrixes, etc., thereby improving the adhesion strength of the interface.

The Chinese invention patent with a publication number of CN108286187A discloses a preparation method of silane coupling agent-assisted electrophoretic deposition initiating graphene oxide modified carbon fiber, after desizing, the carbon fibers are put into an aqueous solution containing aminopropyl triethoxy silane (APTES) and ethanol for hydrolytic amino pretreatment to obtain the carbon fiber treated with silane coupling agent, and the carbon fiber treated with silane coupling agent is connected to the positive electrode of the power supply, and the copper sheet is connected to the negative electrode of the power supply. After electrophoretic deposition with GO aqueous solution as the electrophoretic precipitation solution, the silane coupling agent-assisted electrophoretic deposition initiating graphene oxide modified carbon fiber is obtained, and the interfacial shear strength of carbon fiber reinforced resin matrix composites can be improved effectively.

U.S. Pat. No. 5,580,835 discloses a method for preparing ceramic fibers by electrophoretic deposition of ceramic particles on the surface of continuous fibers. A thick oxide or mixed oxide ceramic coating is deposited on the surface of continuous fibers by electrophoretic deposition to form a ceramic fiber, thereby forming a kind of smooth, compact and consistent ceramic fiber, which simplifies the process steps, and reduces the cost.

The above surface modification method of carbon fiber is mainly to deposit a layer of carbon nanotubes, graphene or other micro/nano particles by electrophoretic deposition process, which weaves the fiber into a cloth or directly puts the fiber bundles into the electrophoretic deposition equipment for deposition, without expanding the fiber bundles, it is easy to deposit a layer of reinforcing phase interface on the surface of the carbon fiber bundle, resulting in low deposition efficiency, and the reinforcing phase cannot be uniformly and effectively deposited on the surface of each carbon fiber filament, which reduces the performance of the composite material.

SUMMARY

The present disclosure aims to overcome the deficiencies of the prior art, and provides a continuous electrophoretic deposition modified carbon fiber reinforced multi-matrix composite and a preparation method thereof. The present disclosure firstly widens the carbon fiber bundle to increase its contact area with the slurry of ceramic particles; and then the continuous electrophoretic deposition of carbon fibers in the electrophoretic deposition equipment is realized by the traction device to increase the efficiency of carbon fiber electrophoretic deposition of ceramic particles while achieving uniform deposition of ceramic particles on the surface of the carbon fiber filament.

A continuous electrophoretic deposition modified carbon fiber reinforced multi-matrix composite according to the present disclosure, composing of a carbon fiber with a volume fraction of 30-55%, an inorganic powder with a volume fraction of 3-25% and a matrix with a volume fraction of 20-67%, in the present disclosure, the inorganic powder is wrapped on the surface of the carbon fiber filament or embedded in the carbon fiber bundle, and the concentration of the inorganic powder gradually decreases from the fiber filament to the surface of the fiber bundle; the inorganic powder is 1-3 types of carbon powder, graphene powder, aluminum oxide powder, zirconium oxide powder, silicon oxide powder, silicon carbide powder, zirconium carbide powder, boron nitride powder, and silicon nitride powder, the particle size of the inorganic powder is 20-1000 nm; and the matrix is 1-3 types of carbon, silicon, aluminum alloy, copper alloy, nickel alloy, ceramic and organic resin.

Preferably, the particle size of the inorganic powder is an average particle size.

Preferably, the matrix is a silicon carbide matrix.

Preferably, the organic resin is epoxy resin.

The present disclosure also discloses a method for preparing the above-mentioned continuous electrophoretic deposition modified carbon fiber reinforced multi-matrix composite, and the preparation sequence is as follows:

(1) Performing degumming and plasma surface treatment of carbon fiber to obtain a pre-treated carbon fiber bundle;

(2) In the deposition tank, using deionized water as a solvent, the inorganic powder as a solid phase, adding a dispersant to prepare a slurry of inorganic powder, adjusting the Zeta potential of the slurry by adding acid and alkali according to the inorganic powder, and then introducing a layer of organic release agent into the deposition tank;

(3) Widening the pre-treated carbon fiber bundle by an ultrasonic fiber expansion method to form a carbon fiber strip with a width of 10-1000 mm;

Then pulling the carbon fiber strip into the deposition tank by a sliding roller on one side of the deposition tank, passing through the horizontal roller in the deposition tank to pull to the other side parallel to the bottom of the tank, then passing through the horizontal roller on the other side of the bottom of the tank to pull upwards perpendicular to the bottom of the tank, and finally pulling out the deposition tank through the sliding roller to obtain the carbon fiber strip deposited with inorganic powders;

During the process of the fiber strip passing through the deposition tank, there is a metal plate on top and bottom parallel to the fiber strip, applying direct current to the sliding roller and the metal plate, the potential of the two sliding rollers is the same, the potential of the two metal plates is the same, and connecting the sliding rail and the metal plate to opposite electrodes;

(4) Wrapping the carbon fiber strip deposited with inorganic powders in step (3) on a mold to form a preform, drying and performing curing treatment;

(5) Performing densification of the ceramic matrix on the dried and cured preform in step (4) by a chemical vapor deposition method or a precursor immersion cracking method to obtain a continuous electrophoretic deposition modified carbon fiber reinforced multi-matrix composite;

Preferably, the step (4) is replaced by: laying the carbon fiber strip deposited with inorganic powders in step (3) to form a preform, drying and curing.

Preferably, the step (4) is replaced by: bundling the carbon fiber strip deposited with inorganic powders in step (3), wrapping the bundled carbon fiber with a flexible protective cover, then weaving to form a preform, and then drying and curing.

Preferably, the step (5) is replaced by: infiltrating an alloy in the dried and cured preform in step (4) by a vacuum pressure melt infiltration method to obtain a continuous electrophoretic deposition modified carbon fiber reinforced multi-matrix composite.

Preferably, the step (5) is replaced by: infiltrating an organic polymer resin in the dried and cured preform in step (4) by a resin transfer molding compound method to obtain the continuous electrophoretic deposition modified carbon fiber reinforced multi-matrix composites.

Preferably, after the step (5), it further includes: (6) infiltrating an alloy in the composite with densified matrix by a vacuum pressure melt infiltration method to obtain the continuous electrophoretic deposition modified carbon fiber reinforced multi-matrix composites.

Preferably, after the step (5), it further includes: (6) infiltrating an organic polymer resin in the composite with densified matrix to obtain the continuous electrophoretic deposition modified carbon fiber reinforced multi-matrix composites.

Preferably, the carbon fiber is 1K carbon fiber, 3K carbon fiber or 10K carbon fiber.

Preferably, in the step (2), the Zeta potential of the slurry is −60 mV, +55 mV or −62 mV.

Preferably, the organic release agent introduced in step (2) is a n-hexane solution, the n-hexane solution is located on the upper layer of the slurry of inorganic powder, the thickness of the n-hexane solution is 1-10 mm, and when the fiber strip is pulled out, n-hexane is adsorbed on the outer surface of the fiber.

Preferably, the metal plate in the step (3) is located in the deposition tank, the distance between the upper and lower metal plates and the fiber strip is 1-5 cm, respectively, and the intersecting angle between the plane of the metal plate and the plane of the fiber strip is 0-10°.

Preferably, the electrode potential connected to the metal plate in the step (3) is opposite to the Zeta potential of the slurry of inorganic powders, and the voltage between the metal plate and the sliding roller and between the metal plate and the carbon fiber strip is 10-100V.

Preferably, in the step (3), the deposition time of the carbon fiber strip in the deposition tank is 1-30 min, and the speed of the carbon fiber strip is 0.1-10 m/h.

Preferably, the step (4) is as follows: the upper and lower surfaces of the carbon fiber strip deposited with the inorganic powder in the step (3) are covered with release paper to obtain the carbon fiber strip prepreg.

Preferably, the pyrolysis temperature of the precursor immersion pyrolysis method is 1200° C., and the immersion-pyrolysis cycle is 12 cycles.

Preferably, the impregnation temperature of the vacuum pressure melt impregnation method is 700° C., and the impregnation pressure is 1.5 MPa.

The beneficial effects of the present disclosure are as follows: the sizing efficiency of ceramic particles is increased, the carbon fiber filaments after the deposition of ceramic particles are not bonded to each other, which improves the manufacturing efficiency of composites, increases the multi-functional characteristics of composites, and realizes low-temperature manufacturing of multi-matrix composites. Compared with traditional methods, it reduces the damage of high temperature to the carbon fiber, ensures the fiber strength, and broadens the application field of composites.

DETAILED DESCRIPTION OF THE EMBODIMENTS

The present disclosure is further described in connection with the embodiments:

Example 1

A continuous electrophoretic deposition modified carbon fiber reinforced multi-matrix composite, composing of 40% volume fraction of carbon fiber, 5% volume fraction of inorganic powder and 50% volume fraction of matrix, wherein the inorganic powder is wrapped on the surface of the carbon fiber filaments or embedded in the carbon fiber bundle, the concentration gradually decreases from the fiber filament to the surface of the fiber bundle; the inorganic powder is boron nitride powder with an average particle size of 50 nm; and the matrix is a silicon carbide matrix.

The above continuous electrophoretic deposition modified carbon fiber reinforced multi-matrix compose is prepared by the steps of the following sequence:
(1) 1K carbon fiber bundle was subjected to degumming in a vacuum environment of 800° C.;
(2) The boron nitride powder was subjected to a micro oxidation treatment to prepare a uniformly dispersed slurry of boron nitride powder, the acid was added to adjust the Zeta potential of the slurry to −60 mV, the slurry was injected into the deposition tank, a layer of n-hexane solution was introduced on the surface of the slurry, and the thickness of n-hexane solution was 5 mm;
(3) The pre-treated carbon fiber bundle was widened by an ultrasonic fiber expansion method to form a carbon fiber strip with a width of 30 mm, then the carbon fiber strip was pulled into the deposition tank by a sliding roller on one side of the deposition tank, passed through the horizontal roller in the tank to pull to the other side parallel to the bottom of the tank, then passed through the horizontal roller on the other side of the bottom of the tank to pull upwards perpendicular to the bottom of the tank, finally pulled out the deposition tank through the sliding roller, during the process of the fiber strip passing through the deposition tank, there was a metal plate on top and bottom parallel to the fiber strip, direct current was applied to the sliding roller and the metal plates, two sliding rollers were connected to the positive electrode, two metal plates were connected to the negative electrode, and the deposition voltage was 15V/cm;
(4) The carbon fiber strip exiting the deposition tank in step (3) was bundled, and the bundled carbon fiber was wrapped with inorganic powders deposited in step (3), then woven to form a three-dimensional four-directional structure preform, dried and cured;
(5) Liquid polycarbosilane was used as the precursor, the precursor immersion cracking method was used to perform densification of the silicon carbide matrix to the dried and cured preform in step (4), the cracking temperature was 1200° C., and continuous electrophoretic deposition modified carbon fiber reinforced multi-matrix composite was obtained after 12 cycles of the impregnation-cracking cycle;

The density of the composite prepared in the above embodiment is 2.0 g/cm$^3$, the room temperature bending strength is 567 MPa, the room temperature tensile strength is 351 MPa, and the room temperature fracture toughness is 27 MPa·m$^{1/2}$.

Example 2

A continuous electrophoretic deposition modified carbon fiber reinforced multi-matrix composite, composing of 45% volume fraction of carbon fiber, 10% volume fraction of inorganic powder and 40% volume fraction of matrix, wherein the inorganic powder is wrapped on the surface of the carbon fiber filaments or embedded in the carbon fiber bundle, and the concentration gradually decreases from the fiber filament to the surface of the fiber bundle; the inorganic powder is aluminum oxide powder with an average particle size of 80 nm; and the matrix is an aluminum alloy matrix.

The above continuous electrophoretic deposition modified carbon fiber reinforced multi-matrix composite is prepared by the steps of the following sequence:
(1) 3K carbon fiber was subjected to degumming treatment in high temperature inert atmosphere;
(2) The uniformly dispersed slurry of alumina powders was prepared, the acid and base were added to adjust the Zeta potential of the slurry to +55 mV, the slurry was injected into the deposition tank, a layer of n-hexane solution was introduced on the surface of the slurry, and the thickness of n-hexane solution was 3 mm;

(3) The pre-treated carbon fiber bundle was widened by an ultrasonic fiber expansion method to form a carbon fiber strip with a width of 100 mm, then the carbon fiber strip was pulled into the deposition tank by a sliding roller on one side of the deposition tank, passed through the horizontal roller in the tank to pull to the other side parallel to the bottom of the tank, then passed through the horizontal roller on the other side of the bottom of the trough to pull upwards perpendicular to the bottom of the trough, finally pulled out the deposition tank through the sliding roller, during the process of the fiber strip passing through the deposition tank, there was a metal plate on top and bottom parallel to the fiber strip, direct current was applied to the sliding roller and the metal plates, two sliding rollers were connected to the negative electrode, two metal plates were connected to the positive electrode, and the deposition voltage was 20V/cm;

(4) The upper and lower surfaces of the carbon fiber strip exiting the deposition tank in step (3) were wrapped with a release paper to form a prepreg;

(5) The prepreg prepared in step (4) was laid unidirectionally into a preform, then subjected to molding, drying and curing;

(6) The vacuum pressure melt infiltration method was used to infiltrate the aluminum alloy into the dried and cured preform in step (5), the infiltration temperature was 700° C., and the infiltration pressure was 1.5 MPa, to obtain a continuous electrophoretic deposition modified carbon fiber reinforced multi-matrix composite.

The density of the composite prepared in the above embodiment is 2.3 g/cm³, the room temperature bending strength is 625 MPa, the room temperature tensile strength is 457 MPa, and the room temperature fracture toughness is 32 MPa·m$^{1/2}$.

Example 3

A continuous electrophoretic deposition modified carbon fiber reinforced multi-matrix composite, composing of 40% volume fraction of carbon fiber, 15% volume fraction of inorganic powder and 40% volume fraction of matrix, wherein the inorganic powder is wrapped on the surface of the carbon fiber filaments or embedded in the carbon fiber bundle, and the concentration gradually decreases from the fiber filament to the surface of the fiber bundle; the inorganic powder is silicon carbide powder and silicon oxide powder with an average particle size of 60 nm; and the matrix is an epoxy resin matrix.

The above continuous electrophoretic deposition modified carbon fiber reinforced multi-matrix composite is prepared by the steps of the following sequence:

(1) 10K carbon fiber was subjected to degumming and surface plasma treatment;

(2) The uniformly dispersed slurry of silicon carbide and silicon oxide powder was prepared, the acid and base were added to adjust the Zeta potential of the slurry to −62 mV, the slurry was injected into the deposition tank, a layer of n-hexane solution was introduced on the surface of the slurry, and the thickness of n-hexane solution was 10 mm;

(3) The pre-treated carbon fiber bundle was widened by an ultrasonic fiber expansion method to form a carbon fiber strip with a width of 500 mm, then the carbon fiber strip was pulled into the deposition tank by a sliding roller on one side of the deposition trough, passed through the horizontal roller in the tank to pull to the other side parallel to the bottom of the tank, then passed through the horizontal roller on the other side of the bottom of the tank to pull upwards perpendicular to the bottom of the tank, finally pulled out the deposition tank through the sliding roller, during the process of the fiber strip passing through the deposition tank, there was a metal plate on top and bottom parallel to the fiber strip, direct current was applied to the sliding roller and the metal plates, two sliding rollers were connected to the positive electrode, two metal plates were connected to the negative electrode, and the deposition voltage was 50V/cm;

(4) The upper and lower surfaces of the carbon fiber strip exiting the deposition tank in step (3) were wrapped with a release paper to form a prepreg;

(5) The prepreg prepared in step (4) was wrapped into a preform, then subjected to drying and curing;

(6) The vacuum pressure melt infiltration method was used to infiltrate the epoxy resin matrix into the dried and cured preform in step (5), the infiltration temperature was 700° C., and the infiltration pressure was 1.5 MPa, to obtain a continuous electrophoretic deposition modified carbon fiber reinforced multi-matrix composite.

The density of the composite prepared in the above embodiment is 1.8 g/cm³, the room temperature bending strength is 1056 MPa, the longitudinal elastic modulus is 135 GPa, the longitudinal tensile strength at room temperature is 767 MPa, and the thermal conductivity of the room temperature reaches 2.31 W/(m·K).

The above embodiments are only the embodiments of the present disclosure, but the design concept of the present disclosure is not limited thereto, and any such conception is used to carry out non-qualitative changes in the present disclosure, and should belong to the range of violations of the scope of the disclosure. However, any simple modifications, equivalent changes and modifications made to the above embodiments according to the technical essence of the present disclosure without departing from the content of the technical solution of the present disclosure still fall within the protection scope of the technical solution of the present disclosure.

What is claimed is:

1. A continuous electrophoretic deposition modified carbon fiber reinforced multi-matrix composite, composing of a carbon fiber with a volume fraction of 30-55%, an inorganic powder with a volume fraction of 10-25%, and a matrix with a volume fraction of 20-67%, wherein the inorganic powder is wrapped on a surface of a carbon fiber filament and then embedded in a carbon fiber bundle, and a concentration of the inorganic powder decreases from the carbon fiber filament to the carbon fiber bundle; the inorganic powder is 1 to 3 types selected from the group consisting of a carbon powder, a graphene powder, an aluminum oxide powder, a zirconium oxide powder, a silicon oxide powder, a silicon carbide powder, a zirconium carbide powder, a boron nitride powder, and a silicon nitride powder, and the inorganic powder has an average particle size of is 20 nm to 80 nm; and the matrix is 1 to 3 types selected from the group consisting of carbon, silicon, an aluminum alloy, a copper alloy, a nickel alloy, a ceramic, and an organic resin.

2. The continuous electrophoretic deposition modified carbon fiber reinforced multi-matrix composite according to claim 1, wherein the matrix is a silicon carbide matrix.

3. The continuous electrophoretic deposition modified carbon fiber reinforced multi-matrix composite according to claim 1, wherein the organic resin is epoxy resin.

4. A method for preparing the continuous electrophoretic deposition modified carbon fiber reinforced multi-matrix composite according to claim 1, wherein including the following sequence of steps:
(1) performing degumming and plasma surface treatment of carbon fiber bundle to obtain a pre-treated carbon fiber bundle;
(2) in the deposition tank, using deionized water as a solvent, the inorganic powder as a solid phase, adding a dispersant to prepare a slurry of inorganic powder, adjusting the Zeta potential of the slurry by adding acid and alkali according to the inorganic powder, and then introducing a layer of organic release agent into a deposition tank;
(3) widening the pre-treated carbon fiber bundle by an ultrasonic fiber expansion method to form a carbon fiber strip with a width of 10-1000 mm;
then pulling the carbon fiber strip into the deposition tank by a sliding roller on one side of the deposition tank, passing through the horizontal roller in the deposition tank to pull to the other side parallel to the bottom of the tank, then passing through the horizontal roller on the other side of the bottom of the tank to pull upwards perpendicular to the bottom of the tank, and finally pulling out the deposition tank through the sliding roller to obtain the carbon fiber strip deposited with inorganic powders;
during the process of the fiber strip passing through the deposition tank, there is a metal plate on top and bottom parallel to the fiber strip, applying direct current to the sliding rollers and the metal plates, the potential of the two sliding rollers is the same, the potential of the two metal plates is the same, and connecting the sliding rail and the metal plates to opposite electrodes;
(4) wrapping the carbon fiber strip deposited with inorganic powders in step (3) on a mold to form a preform, drying and performing curing treatment; and
(5) performing densification of the ceramic matrix to the dried and cured preform in step (4) by a chemical vapor deposition method or a precursor immersion cracking method to obtain a continuous electrophoretic deposition modified carbon fiber reinforced multi-matrix composite.

5. The method for preparing the continuous electrophoretic deposition modified carbon fiber reinforced multi-matrix composite according to claim 4, wherein after the step (5), it further includes: (6) infiltrating an alloy in the composite with densified matrix by a vacuum pressure melt infiltration method to obtain the continuous electrophoretic deposition modified carbon fiber reinforced multi-matrix composites.

6. The method for preparing the continuous electrophoretic deposition modified carbon fiber reinforced multi-matrix composite according to claim 4, wherein after the step (5), it further includes: (6) infiltrating an organic polymer resin in the composite with densified matrix by a resin transfer molding compound method to obtain the continuous electrophoretic deposition modified carbon fiber reinforced multi-matrix composites.

7. The method for preparing the continuous electrophoretic deposition modified carbon fiber reinforced multi-matrix composite according to claim 4, wherein the carbon fiber is 1K carbon fiber, 3K carbon fiber or 10K carbon fiber.

8. The method for preparing the continuous electrophoretic deposition modified carbon fiber reinforced multi-matrix composite according to claim 4, wherein in the step (2), the Zeta potential of the slurry is −60 mV, +55 mV or −62 mV.

9. The method for preparing the continuous electrophoretic deposition modified carbon fiber reinforced multi-matrix composite according to claim 4, wherein the organic release agent introduced in step (2) is a n-hexane solution, the n-hexane solution is located on the upper layer of the slurry of inorganic powder, the thickness of the n-hexane solution is 1-10 mm, and when the carbon fiber strip is pulled out, n-hexane is adsorbed on the outer surface of the fiber.

10. The method for preparing the continuous electrophoretic deposition modified carbon fiber reinforced multi-matrix composite according to claim 4, wherein the metal plate in the step (3) is located in the deposition tank, the distance between the upper and lower metal plates and the carbon fiber strip is 1-5 cm, respectively, and the intersecting angle between the plane of the metal plate and the plane of the fiber strip is 0-10°.

11. The method for preparing the continuous electrophoretic deposition modified carbon fiber reinforced multi-matrix composite according to claim 4, wherein the electrode potential connected to the metal plate in the step (3) is opposite to the Zeta potential of the slurry of inorganic powder, and the voltage between the metal plate and the sliding roller and between the metal plate and the carbon fiber strip is 10-100V.

12. The method for preparing the continuous electrophoretic deposition modified carbon fiber reinforced multi-matrix composite according to claim 4, wherein in the step (3), the deposition time of the carbon fiber strip in the deposition tank is 1-30 min, and the speed of the carbon fiber strip is 0.1-10 m/h.

13. The method for preparing the continuous electrophoretic deposition modified carbon fiber reinforced multi-matrix composite according to claim 4, wherein the step (4) is as follows, the upper and lower surfaces of the carbon fiber strip deposited with the inorganic powder in the step (3) are covered with release paper to obtain the carbon fiber strip prepreg.

14. The method for preparing the continuous electrophoretic deposition modified carbon fiber reinforced multi-matrix composite according to claim 4, wherein the pyrolysis temperature of the precursor immersion pyrolysis method is 1200° C., and the immersion-pyrolysis cycle is 12 cycles.

* * * * *